US012473611B2

(12) United States Patent
Brodjonegoro et al.

(10) Patent No.: US 12,473,611 B2
(45) Date of Patent: Nov. 18, 2025

(54) DYNAMIC OPTIMIZATION METHOD FOR ACID-TO-ORE RATIO IN HIGH-PRESSURE LEACHING OF LATERITE NICKEL ORE (71) Applicants: PT ESG NEW ENERGY MATERIAL, Dki Jakarta (ID); PT QMB NEW ENERGY MATERIALS, Dki Jakarta (ID); GEM CO., LTD., Guangdong (CN); PT GEM INDONESIA NEW ENERGY MATERIALS, Dki Jakarta (ID)

(72) Inventors: Satryo Soemantri Brodjonegoro, Dki Jakarta (ID); Kaihua Xu, Guangdong (CN); Yi Wang, Dki Jakarta (ID); Rizky Wanaldi, Dki Jakarta (ID); Tegar Mukti Aji, Dki Jakarta (ID); Evan Wahyu Kristiyanto, Dki Jakarta (ID); Andi Syaputra Hasibuan, Dki Jakarta (ID); Piyan Rahmadi, Dki Jakarta (ID)

(73) Assignees: GEM CO., LTD., Shenzhen (CN); PT GEM INDONESIA NEW ENERGY MATERIALS, Jakarta Selatan (ID)

(*) Notice: Subject to any disclaimer, the term of this patent is extended or adjusted under 35 U.S.C. 154(b) by 0 days.

(21) Appl. No.: 18/870,455

(22) PCT Filed: Jul. 27, 2023

(86) PCT No.: PCT/CN2023/109608
§ 371 (c)(1),
(2) Date: Nov. 29, 2024

(87) PCT Pub. No.: WO2025/020176
PCT Pub. Date: Jan. 30, 2025

(65) Prior Publication Data
US 2025/0171876 A1 May 29, 2025

(51) Int. Cl.
C22B 3/00 (2006.01)
C22B 3/08 (2006.01)
G05D 7/00 (2006.01)

(52) U.S. Cl.
CPC .............. *C22B 23/043* (2013.01); *C22B 3/08* (2013.01); *G05D 7/00* (2013.01)

(58) Field of Classification Search
None
See application file for complete search history.

(56) References Cited

U.S. PATENT DOCUMENTS

| 5,535,992 A * | 7/1996 | Krause | C22B 3/02 |
| | | | 266/171 |
| 2018/0030569 A1* | 2/2018 | Sakamoto | C22B 3/02 |

FOREIGN PATENT DOCUMENTS

| CN | 103614571 A | 3/2014 |
| CN | 104762493 A | 7/2015 |

(Continued)

OTHER PUBLICATIONS

NIST, "Fundamental Physical Constants—molar gas constant R". In NIST Standard Reference Database 123, 1996. Accessed electronically on Mar. 17, 2025 at https://physics.nist.gov/cgi-bin/cuu/Value? r. (Year: 1996).*

(Continued)

*Primary Examiner* — Anthony J Zimmer
*Assistant Examiner* — Zachary John Baum (57) ABSTRACT A dynamic optimization method for acid-to-ore ratio in high-pressure leaching of laterite nickel ore includes: obtaining a feed ore composition, a pulp concentration, a pulp flow rate, a leaching temperature and a pulp duration time in an autoclave, and setting a target leaching rate of nickel; setting a flow rate of sulfuric acid; obtaining a relationship between a hydrogen ion concentration in a solution and a reaction time; obtaining a theoretical leaching rate of nickel when a (Continued)

leaching time reaches the pulp duration time in the autoclave; comparing the theoretical leaching rate of nickel with the target leaching rate of nickel; adjusting the set flow rate of the sulfuric acid until the theoretical leaching rate of nickel is equal to the target leaching rate of nickel, calculating a corresponding optimal acid-to-ore ratio; and adjusting an opening degree of a sulfuric acid flow regulating valve of the autoclave.

12 Claims, 5 Drawing Sheets

(56) References Cited

FOREIGN PATENT DOCUMENTS

| | | | | |
|---|---|---|---|---|
| CN | 109837386 A | | 6/2019 | |
| CN | 111004916 A | * | 4/2020 | ........... C22B 23/043 |
| CN | 113564383 A | | 10/2021 | |
| CN | 113999989 A | | 2/2022 | |
| EA | 008573 B1 | * | 6/2007 | |
| WO | 2010020245 A1 | | 2/2010 | |

OTHER PUBLICATIONS

English translation of EA 008573 B1. (Year: 2007).*
English translation of CN-111004916-A Description (Year: 2020).*
International Search Report issued in corresponding International application No. PCT/CN2023/109608, mailed Nov. 21, 2023 (9 pages).
Written Opinion of the International Search Authority in corresponding International application No. PCT/CN2023/109608, mailed Nov. 21, 2023 (9 pages).

* cited by examiner

DYNAMIC OPTIMIZATION METHOD FOR ACID-TO-ORE RATIO IN HIGH-PRESSURE LEACHING OF LATERITE NICKEL ORE

FIELD OF THE DISCLOSURE

The disclosure relates to the technical field of high-pressure leaching of laterite nickel ore, and in particular, to a dynamic optimization method for acid-to-ore ratio in high-pressure leaching of laterite nickel ore.

BACKGROUND

Hydrometallurgical Processing mainly includes atmospheric leaching and pressurized leaching. Pressurized leaching process generally includes firstly making an ore into a pulp, then preheating the pulp, acid leaching the preheated pulp in a high-pressure autoclave, and then lowering a temperature and pressure of the pulp, neutralizing and separating the pulp, and purifying leach slurry.

During the pressurized leaching process, the acid-to-ore ratio is an important control parameter. If the acid-to-ore ratio is too low, metal ions of Ni, Co and Mn in the laterite nickel ore may be leached too slowly, resulting in a low production efficiency. However, an excessive acid-to-ore ratio may lead to an excessive residual acid content after leaching, which results in more using of neutralizer and precipitators in subsequent pre-neutralization and precipitation processes, and an excessive quantity of sulfuric acid in a raw material causes an unnecessary increase in costs. Therefore, in a high-pressure acid leaching process of laterite nickel ore, an optimal acid-to-ore ratio exists, which can ensure the leaching rate of metal ions of Ni, Co, and Mn, and also void unnecessary acid waste.

Currently, a determination of the optimal acid-to-ore ratio is mainly performed by using a laboratory pilot experiment. However, because there is a difference in processes of mass transfer and heat transfer between a pilot apparatus and a large autoclave, the optimal acid-to-ore ratio determined by the pilot apparatus is also different from the optimal acid-to-ore ratio in the large autoclave. The optimal acid-to-ore ratio under an operating condition of the large autoclave cannot be completely deduced by using experimental data of the pilot apparatus. In addition, acid consumptions in the leaching process of different metals are different, and the optimal acid-to-ore ratio is also a variable value that fluctuates with feed ore composition and pulp concentration. However, in a current high-pressure acid leaching process, a fixed acid-to-ore ratio is usually used or only adjusted by means of manual judgment. Therefore, in an actual operation process, the acid-to-ore ratio may be too high or too low, that may result technical problems of an unnecessary cost increasing or a production efficiency reduction.

SUMMARY

The purpose of this disclosure is to provide a dynamic optimization method for acid-to-ore ratio in high-pressure leaching of laterite nickel ore, thereby solving technical problems that the high-pressure acid-to-ore ratio is too high or too low during actual operation, resulting in unnecessary cost increasing or production efficiency decrease.

In order to solve the above technical problems, this disclosure provides a dynamic optimization method for acid-to-ore ratio in high-pressure leaching of laterite nickel ore, comprising:

obtaining a feed ore composition, a pulp concentration, a pulp flow rate, a leaching temperature and a pulp duration time in an autoclave, and setting a target leaching rate of nickel;

setting a flow rate of sulfuric acid;

according to the set flow rate of sulfuric acid, the feed ore composition, the pulp concentration, the pulp flow rate, and the leaching temperature, obtaining a relationship between a hydrogen ion concentration in a solution and a reaction time;

according to the relationship between the hydrogen ion concentration in the solution and the reaction time, the feed ore composition, the pulp concentration, the pulp flow rate, and the pulp duration time in the autoclave, obtaining a theoretical leaching rate of nickel when a leaching time reaches the pulp duration time in the autoclave at a current flow rate of sulfuric acid;

comparing the theoretical leaching rate of nickel with the target leaching rate of nickel; if the theoretical leaching rate of nickel is not equal to the target leaching rate of nickel, adjusting the set flow rate of the sulfuric acid, repeatedly performing the foregoing steps until the theoretical leaching rate of nickel is equal to the target leaching rate of nickel, outputting the current flow rate of sulfuric acid as an optimal flow rate of sulfuric acid, and calculating a corresponding optimal acid-to-ore ratio; and according to the optimal acid-to-ore ratio, adjusting an opening degree of a sulfuric acid flow regulating valve of the autoclave to ensure that an actual high-pressure acid leaching process is performed under an optimal acid-to-ore ratio condition all the time.

In some embodiments, according to the set flow rate of the sulfuric acid, the feed mineral composition, the pulp concentration, the pulp flow rate, and the leaching temperature, obtaining a relationship between a hydrogen ion concentration in a solution and a reaction time, comprises:

setting a current time and a hydrogen ion concentration in the solution under a condition of the current flow rate of acid sulfuric;

according to the feed ore composition, the pulp concentration, the pulp flow rate, the set flow rate of sulfuric acid, and the set hydrogen ion concentration in the solution, obtaining leaching rates of nickel ion, cobalt ion, aluminum ion, and iron ion in the solution at the current time;

according to the leaching rates of aluminum ion and iron ion in the solution, obtaining hydrolytic precipitation amounts of aluminum ion and iron ion at the current time;

according to the hydrolytic precipitation amounts of aluminum ion and iron ion at the set current time and the set current flow rate of sulfuric acid, obtaining a first sulfate concentration in the solution at the current time;

according to concentrations of nickel ion, cobalt ion, aluminum ion, and iron ion in the solution at the current time, obtaining a second sulfate concentration in the solution at the current time; and comparing the first sulfate concentration with the second sulfate concentration, if the first sulfate concentration and the second sulfate concentration are not equal, correcting the set hydrogen ion concentration in the solution, and repeatedly performing the foregoing steps until the first sulfate concentration and the second sulfate concentration are equal, outputting the set hydrogen ion concentration in the current solution as an actual hydrogen ion concentration.

In some embodiments, according to the feed ore composition, the pulp concentration, the pulp flow rate, the set flow rate of sulfuric acid, and the set hydrogen ion concentration in the solution, obtaining leaching rates of nickel ion, cobalt ion, aluminum ion, and iron ion in the solution at the current time, wherein, the leaching rate of nickel ion in the solution at the current time is obtained according to a formula as follows:

$$7.806 \times 10^7 \times e^{-\frac{87.75 \times 10^3}{RT}} [H^+] t = 1 - 3\left(1 - \frac{X_{Ni}}{X_{Ni}^\infty}\right)^{\frac{2}{3}} + 2\left(1 - \frac{X_{Ni}}{X_{Ni}^\infty}\right),$$

wherein, R represents a gas constant, T represents the leaching temperature, $[H^+]$ represents the set hydrogen ion concentration in the solution, t represents the current time, $X_{Ni}$ represents the leaching rate of nickel ion in the solution at the current time, $X_{Ni}^\infty$ represents a maximum leaching rate of nickel ion in the solution, and is calculated according to the feed ore composition, the pulp concentration, and the pulp flow rate.

In some embodiments, the leaching rate of cobalt ion in the solution at the current time is obtained according to a formula as follows:

$$0.303 \times e^{-\frac{3179}{RT}} [H^+] t = \left(1 - \left(1 - \frac{X_{Co}}{X_{Co}^\infty}\right)^{\frac{1}{3}}\right)^2,$$

wherein, R represents a gas constant, T represents the leaching temperature, $[H^+]$ represents the set hydrogen ion concentration in the solution, t represents the current time, $X_{Co}$ represents the leaching rate of cobalt ion in the solution at the current time, $X_{Co}^\infty$ represents a maximum leaching rate of cobalt ion in the solution, and is calculated according to the feed ore composition, the pulp concentration, and the pulp flow rate.

In some embodiments, the leaching rate of aluminum ion in the solution at the current time is obtained according to a formula as follows:

$$2.68 \times 10^9 \times e^{-\frac{101.9 \times 10^3}{RT}} [H^+] t = 1 - 3\left(1 - \frac{X_{Al}}{X_{Al}^\infty}\right)^{\frac{2}{3}} + 2\left(1 - \frac{X_{Al}}{X_{Al}^\infty}\right),$$

wherein R represents a gas constant, T represents the leaching temperature, $[H^+]$ represents the set hydrogen ion concentration in the solution, t represents the current time, $X_{Al}$ represents the leaching rate of aluminum ion at the current time in the solution, $X_{Al}^\infty$ represents a maximum leaching rate of aluminum ion in the solution, and is calculated according to the feed ore composition, the pulp concentration, and the pulp flow rate.

In some embodiments, the leaching rate of iron ion in the solution at the current time is obtained according to a formula as follows:

$$4.91 \times 10^8 \times e^{-\frac{93.03 \times 10^3}{RT}} [H^+] t = 1 - 3\left(1 - \frac{X_{Fe}}{X_{Fe}^\infty}\right)^{\frac{2}{3}} + 2\left(1 - \frac{X_{Fe}}{X_{Fe}^\infty}\right),$$

wherein, R represents a gas constant, T represents the leaching temperature, $[H^+]$ represents the set hydrogen ion concentration in the solution, t represents the current time, $X_{Fe}$ represents the leaching rate of iron ion in the solution at the current time, $X_{Fe}^\infty$ represents a maximum leaching rate of iron ion in the solution, and is calculated according to the feed ore composition, the pulp concentration, and the pulp flow rate.

In some embodiments, according to the leaching rates of aluminum ion and iron ion in the solution, obtaining hydrolytic precipitation amounts of aluminum ion and iron ion at the current time, wherein, the hydrolytic precipitation amount of aluminum ion at the current time is obtained according to formulas as follows:

$$\frac{dM_{Al}}{dt} = 0.408[H^+](S_{Al} - 1)M_{Al}$$

$$S_{Al} = \frac{C_{Al}^{in} \times X_{Al}}{[Al_2(SO_4)_3(aq)]}$$

$$lg\left(\frac{[H^+]^{5/2}[HSO_4^-]^{5/2}}{[Al_2(SO_4)_3(aq)]}\right) = -\frac{4464}{T} + 3.774 + \frac{14.21\sqrt{I_{c,Al_2(SO_4)_3}}}{1 + 1.6\sqrt{I_{c,Al_2(SO_4)_3}}} - 1.667\sqrt{I_{c,Al_2(SO_4)_3}}$$

$$I_{c,Al_2(SO_4)_3} = 1/2(4*[SO_4^{2-}] + 9*[Al^{3+}])$$

$$[HSO_4^-] = [H^+],$$

wherein, T represents the leaching temperature, t represents the current time, $M_{Al}$ represents the current hydrolytic precipitation amount of aluminum ion in the solution at the current time, $[H^+]$ represents the set hydrogen ion concentration in the solution, $S_{Al}$ represents a saturation of aluminum ion in the solution, $X_{Al}$ represents the leaching rate of aluminum ion in the solution, $C_{Al}^{in}$ represents an Al concentration in the pulp, and is calculated according to the feed ore composition, the pulp concentration, and the pulp flow rate, $[Al_2(SO_4)_3(aq)]$ represents a solubility of aluminum sulfate in the solution, $[SO_4^{2-}]$ represents the first sulfate concentration in the solution at the current time, $[Al^{3+}]$ represents the concentration of aluminum ion in the solution, and is calculated according to the feed ore composition, the pulp concentration, and the pulp flow rate, $[HSO_4^-]$ represents a concentration of hydrogen sulfate ion in the solution, and $I_{c,Al_2(SO_4)_3}$ represents an ion strength of $Al_2(SO_4)_3$.

In some embodiments, the hydrolytic precipitation amount of iron ion at the current time is obtained according to formulas as follows:

$$\frac{M_{Fe}}{[Fe_2(SO_4)_3(aq)] \times S_{Fe}} = 0.0114 S_{Fe}^2 - 0.254 S_{Fe} + 1.2483$$

$$S_{Fe} = 6.725 - 5.735 \frac{X_{Ni}}{X_{Ni}^\infty}$$

$$lg\left(\frac{[H^+][HSO_4^-]}{[(Fe_2(SO_4))_3(aq)]}\right) = -\frac{2740}{T} + 10.72 - \frac{9.905\sqrt{I_{c,Fe_2(SO_4)_3}}}{1 + 1.6\sqrt{I_{c,Fe_2(SO_4)_3}}} + 0.0294\sqrt{I_{c,Fe_2(SO_4)_3}}$$

$$I_{c,Fe_2(SO_4)_3} = 1/2(4*[SO_4^{2-}] + 9*[Fe^{3+}])$$

$$[HSO_4^-] = [H^+],$$

wherein, T represents the leaching temperature, $M_{Fe}$ represents hydrolytic precipitation amount of iron ion at a current time, $[H^+]$ represents the set hydrogen ion concentration in the solution, $S_{Fe}$ represents a saturation of iron ion in the solution, $X_{Ni}$ represents the leaching rate of nickel ion in the solution, [Fe$_2$(SO$_4$)$_3$(aq)] represents a solubility of iron sulfate in the solution, $X_{Ni}^\infty$ represents a maximum leaching rate of nickel ion in the solution, [SO$_4^{2-}$] represents the first sulfate concentration of in the current time solution, [Fe$^{3+}$] represents the concentration of iron ion in the solution, and is calculated according to the feed ore composition, the pulp concentration, and the pulp flow rate, [HSO$_4^-$] represents a concentration of hydrogen sulfate ion in the solution, and $I_{c,Fe_2(SO_4)_3}$ represents an ion strength of [Fe$_2$(SO$_4$)$_3$].

In some embodiments, according to the hydrolytic precipitation amounts of aluminum ion and iron ion at the set current time and the set current flow rate of sulfuric acid, obtaining a first sulfate concentration in the solution at the current time, comprises:

according to the current set flow rate of acid sulfuric, obtaining a total sulfate concentration;

according to the hydrolytic precipitation amounts of aluminum ion and iron ion at the current time, obtaining a sulfate content in hydrolysis precipitate; and according to the total sulfate concentration and the sulfate content in the hydrolysis precipitate, obtaining the first sulfate concentration in solution at the current time.

In some embodiments, comparing the first sulfate concentration with the second sulfate concentration, if the first sulfate concentration and the second sulfate concentration are not equal, correcting the set hydrogen ion concentration in the solution, and repeatedly performing the foregoing steps until the first sulfate concentration and the second sulfate concentration are equal, outputting the set hydrogen ion concentration in the current solution as an actual hydrogen ion concentration, wherein, the set hydrogen ion concentration in the solution is corrected according to a formula as follows:

$$[H^+](\text{after correction}) = [H^+](\text{before correction}) + k \times (SO_4^* - SO_4^{**})$$

wherein, [H$^+$](after correction) represents a corrected set hydrogen ion concentration, [H$^+$](before correction) represents a current set hydrogen ion concentration, SO$_4^*$ represents the first sulfate concentration, SO$_4^{**}$ represents the second sulfate concentration, and k represents a proportion coefficient.

In some embodiments, according to the feed ore composition, the pulp concentration, the pulp flow rate, the set flow rate of sulfuric acid, and the set hydrogen ion concentration in the solution, obtaining leaching rates of nickel ion, cobalt ion, aluminum ion, and iron ion in the solution at the current time, wherein, the theoretical leaching rate of nickel when a leaching time reaches the pulp duration time in the autoclave at a current flow rate of sulfuric acid is obtained according to a formula as follows:

$$7.806 \times 10^7 \times e^{-\frac{87.75 \times 10^3}{RT}} [H^+] t = 1 - 3\left(1 - \frac{X_{Ni}}{X_{Ni}^\infty}\right)^{\frac{2}{3}} + 2\left(1 - \frac{X_{Ni}}{X_{Ni}^\infty}\right),$$

wherein, R represents a gas constant, T represents the leaching temperature, [H$^+$] represents the hydrogen ion concentration in the solution at a time t, t represents the current time, $X_{Ni}$ represents the leaching rate of nickel ion in the solution at the current time, $X_{Ni}^\infty$ represents a maximum leaching rate of nickel ion in the solution, and is calculated according to the feed ore composition, the pulp concentration, and the pulp flow rate.

In some embodiments, comparing the theoretical leaching rate of nickel with the target leaching rate of nickel; if the theoretical leaching rate of nickel is not equal to the target leaching rate of nickel, adjusting the set flow rate of the sulfuric acid, repeatedly performing the foregoing steps until the theoretical leaching rate of nickel is equal to the target leaching rate of nickel, comprises:

if the theoretical leaching rate of nickel is greater than the target leaching rate of nickel, reducing the flow rate of sulfuric acid; and if the theoretical leaching rate of nickel is less than the target leaching rate of nickel, increasing the flow rate of sulfuric acid.

Compared with existing technologies, the beneficial effect of this disclosure is: providing a high-pressure acid leaching mathematical model and an optimal acid-to-ore ratio calculation method, calculating the optimal acid-to-ore ratio by inputting a real-time feed ore component into the high-pressure acid leaching mathematical model, a sulfuric acid addition flow of a high-pressure leaching link of the clay nickel ore can be dynamically adjusted according to the feed mineral component, so that a high-pressure acid leaching process is always in a dynamic optimal state with the optimal acid-to-ore ratio. Compared with the conventional method for optimizing the acid-to-ore ratio through a pilot experiment, the method has advantages of fast response and accurate optimization.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The technical solutions in the embodiments of the application will be described clearly and completely in combination with the drawings in the embodiments of this disclosure.

Figure 1:
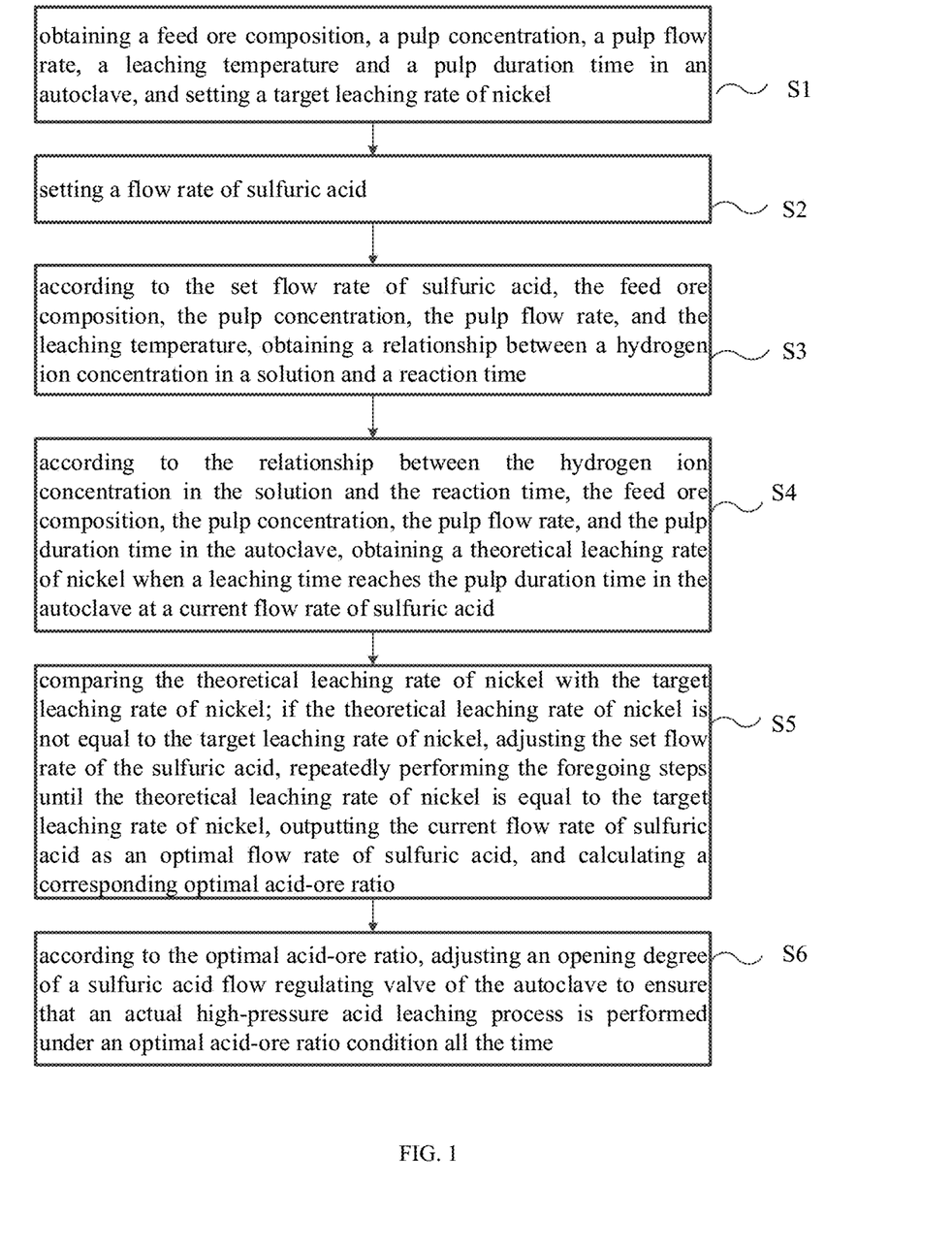
FIG. 1 is a schematic flowchart of the dynamic optimization method for acid-to-ore ratio in high-pressure leaching of laterite nickel ore, according to an embodiment of the disclosure.
Figure 2:
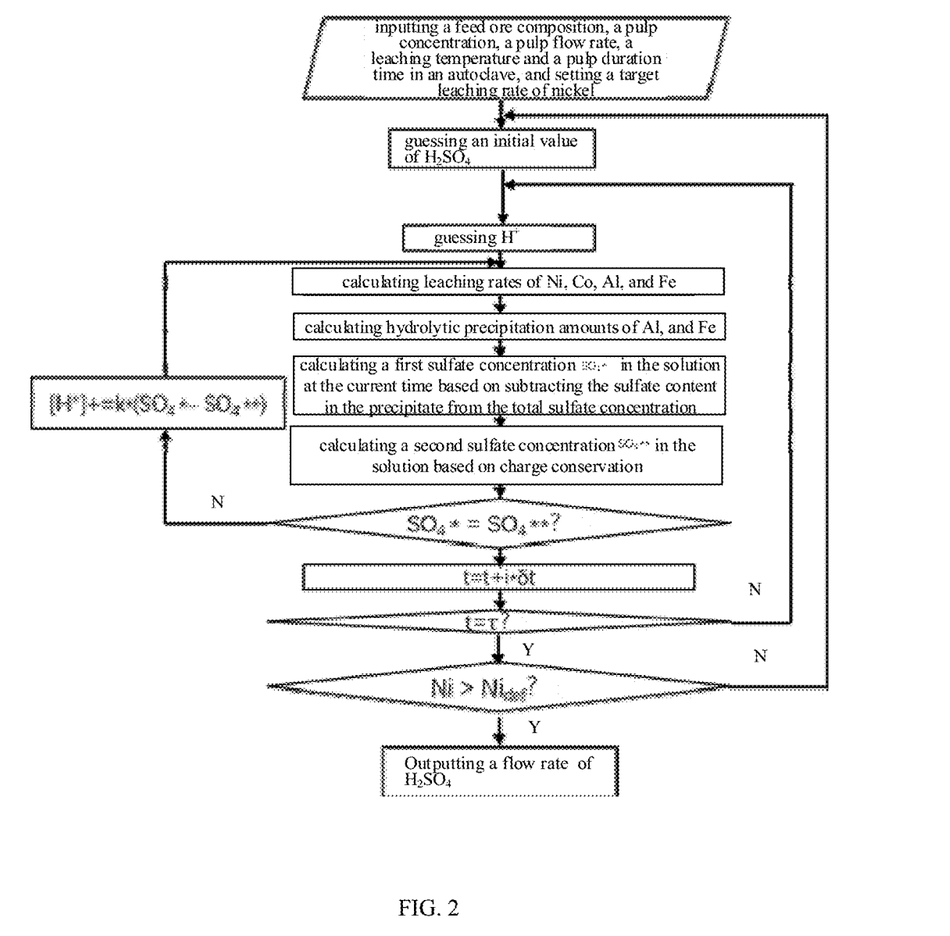
FIG. 2 is a flowchart of an algorithm of the dynamic optimization method for acid-to-ore ratio in high-pressure leaching of laterite nickel ore, according to an embodiment of the disclosure.

Referring to FIG. 1 and FIG. 2, the disclosure provides a dynamic optimization method for acid-to-ore ratio in high-pressure leaching of laterite nickel ore, including the following steps:

S1, obtaining a feed ore composition, a pulp concentration, a pulp flow rate, a leaching temperature and a pulp duration time in an autoclave, and setting a target leaching rate of nickel.

S2, setting a flow rate of sulfuric acid.

S3, according to the set flow rate of the sulfuric acid, the feed ore composition, the pulp concentration, the pulp flow rate, and the leaching temperature, obtaining a relationship between a hydrogen ion concentration in a solution and a reaction time (the solution mentioned in the disclosure refers to a solution in an autoclave). The hydrogen ion concentration in the solution has an important effect on leaching of nickel, cobalt, aluminum, and iron. However, the hydrogen ion concentration in the solution cannot be directly obtained by using the flow rate of sulfuric acid. In the disclosure, the hydrogen ion concentration in the solution is obtained by using the following method.

Figure 3:
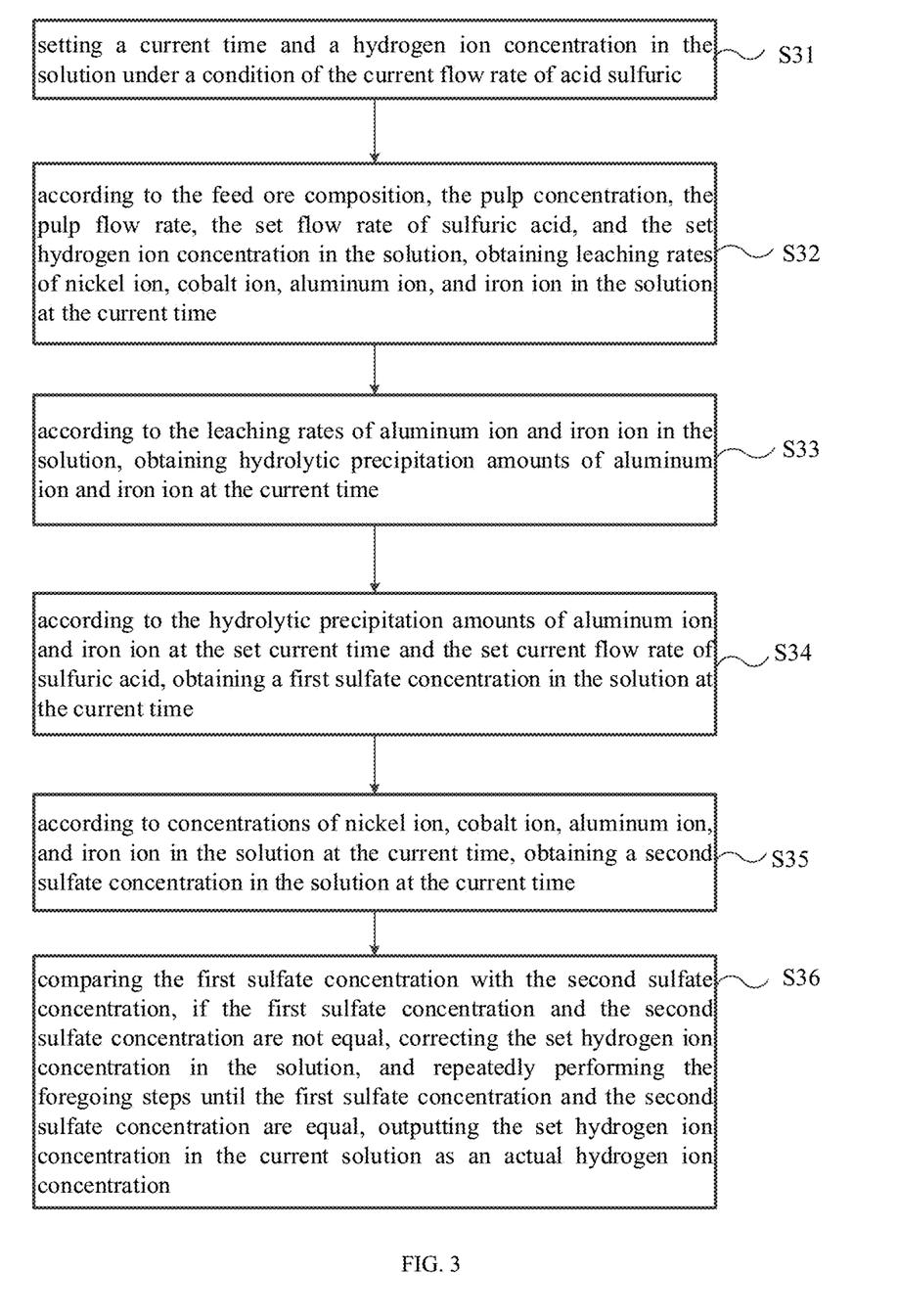
FIG. 3 is a flowchart of step S3 shown in FIG. 1, according to an embodiment of the disclosure.

Referring to FIG. 2 and FIG. 3, a specific method for obtaining a hydrogen ion concentration in a solution includes the following steps:

S31, setting a current time and a hydrogen ion concentration in the solution under a condition of the current flow rate of acid sulfuric.

S32, according to the feed ore composition, the pulp concentration, the pulp flow rate, the set flow rate of sulfuric acid, and the set hydrogen ion concentration in the solution, obtaining leaching rates of nickel ion, cobalt ion, aluminum ion, and iron ion in the solution at the current time.

Wherein, the leaching rate of nickel ion in the solution at the current time is calculated according to a formula as follows:

$$7.806 \times 10^7 \times e^{-\frac{87.75 \times 10^3}{RT}} [H^+]t = 1 - 3\left(1 - \frac{X_{Ni}}{X_{Ni}^\infty}\right)^{\frac{2}{3}} + 2\left(1 - \frac{X_{Ni}}{X_{Ni}^\infty}\right)$$

Wherein, R represents a gas constant, T represents the leaching temperature, [H$^+$] represents the set hydrogen ion concentration in the solution, t represents the current time, $X_{Ni}$ represents the leaching rate of nickel ion in the solution at the current time, $X_{Ni}^\infty$ represents a maximum leaching rate of nickel ion in the solution, and is calculated according to the feed ore composition, the pulp concentration, and the pulp flow rate.

The leaching rate of cobalt ion in the solution at the current time is calculated according to a formula as follows:

$$0.303 \times e^{-\frac{3179}{RT}} [H^+]t = \left(1 - \left(1 - \frac{X_{Co}}{X_{Co}^\infty}\right)^{\frac{1}{3}}\right)^2$$

Wherein, R represents a gas constant, T represents the leaching temperature, [H$^+$] represents the set hydrogen ion concentration in the solution, t represents the current time, $X_{Co}$ represents the leaching rate of cobalt ion in the solution at the current time, $X_{Co}^\infty$ represents a maximum leaching rate of cobalt ion in the solution, and is calculated according to the feed ore composition, the pulp concentration, and the pulp flow rate.

The leaching rate of aluminum ion in the solution at the current time is calculated according to a formula as follows:

$$2.68 \times 10^9 \times e^{-\frac{101.9 \times 10^3}{RT}} [H^+]t = 1 - 3\left(1 - \frac{X_{Al}}{X_{Al}^\infty}\right)^{\frac{2}{3}} + 2\left(1 - \frac{X_{Al}}{X_{Al}^\infty}\right)$$

Wherein, R represents a gas constant, T represents the leaching temperature, [H$^+$] represents the set hydrogen ion concentration in the solution, t represents the current time, $X_{Al}$ represents the leaching rate of aluminum ion at the current time in the solution, $X_{Al}^\infty$ represents a maximum leaching rate of aluminum ion in the solution, and is calculated according to the feed ore composition, the pulp concentration, and the pulp flow rate.

The leaching rate of iron ion in the solution at the current time is calculated according to a formula as follows:

$$4.91 \times 10^8 \times e^{-\frac{93.03 \times 10^3}{RT}} [H^+]t = 1 - 3\left(1 - \frac{X_{Fe}}{X_{Fe}^\infty}\right)^{\frac{2}{3}} + 2\left(1 - \frac{X_{Fe}}{X_{Fe}^\infty}\right)$$

Wherein, R represents a gas constant, T represents the leaching temperature, [H$^+$] represents the set hydrogen ion concentration in the solution, t represents the current time, $X_{Fe}$ represents the leaching rate of iron ion in the solution at the current time, $X_{Fe}^\infty$ represents a maximum leaching rate of iron ion in the solution, and is calculated according to the feed ore composition, the pulp concentration, and the pulp flow rate.

S33, according to the hydrolytic precipitation amounts of aluminum ion and iron ion at the set current time and the set current flow rate of sulfuric acid, obtaining a first sulfate concentration in the solution at the current time.

The hydrolytic precipitation amount of aluminum ion at the current time is calculated according to formulas as follows:

$$\frac{dM_{Al}}{dt} = 0.408[H^+](S_{Al} - 1)M_{Al}$$

$$S_{Al} = \frac{C_{Al}^{in} \times X_{Al}}{[Al_2(SO_4)_3(aq)]}$$

$$lg\left(\frac{[H^+]^{5/2}[HSO_4^-]^{5/2}}{[(Al_2(SO_4))_3(aq)]}\right) = -\frac{4464}{T} + 3.774 + \frac{14.21\sqrt{I_{c,Al_2(SO_4)_3}}}{1 + 1.6\sqrt{I_{c,Al_2(SO_4)_3}}} - 1.667\sqrt{I_{c,Al_2(SO_4)_3}}$$

$$I_{c,Al_2(SO_4)_3} = 1/2(4*[SO_4^{2-}] + 9*[Al^{3+}])$$

$$[HSO_4^-] = [H^+]$$

wherein, T represents the leaching temperature, t represents the current time, $M_{Al}$ represents the current hydrolytic precipitation amount of aluminum ion in the solution at the current time, [H$^+$] represents the set hydrogen ion concentration in the solution, $S_{Al}$ represents a saturation of aluminum ion in the solution, $X_{Al}$ represents the leaching rate of aluminum ion in the solution, $C_{Al}^{in}$ represents an Al concentration in the pulp, and is calculated according to the feed ore composition, the pulp concentration, and the pulp flow rate, [Al$_2$(SO$_4$)$_3$(aq)] represents a solubility of aluminum sulfate in the solution, [SO$_4^{2-}$] represents the first sulfate concentration in the solution at the current time, [Al$^{3+}$] represents a concentration of aluminum ion in the solution, and is calculated according to the feed ore composition, the pulp concentration, and the pulp flow rate, [HSO$_4^-$] represents a concentration of hydrogen sulfate ion in the solution, and $I_{c,Al_2(SO_4)_3}$ represents an ion strength of $Al_2(SO_4)_3$.

The hydrolytic precipitation amount of iron ion at the current time is calculated according to formulas as follows:

$$\frac{M_{Fe}}{[Fe_2(SO_4)_3(aq)] \times S_{Fe}} = 0.0114 S_{Fe}^2 - 0.254 S_{Fe} + 1.2483$$

$$S_{Fe} = 6.725 - 5.735 \frac{X_{Ni}}{X_{Ni}^\infty}$$

$$lg\left(\frac{[H^+][HSO_4^-]}{[(Fe_2(SO_4))_3(aq)]}\right) = -\frac{2740}{T} + 10.72 - \frac{9.905\sqrt{I_{c,Fe_2(SO_4)_3}}}{1 + 1.6\sqrt{I_{c,Fe_2(SO_4)_3}}} + 0.0294\sqrt{I_{c,Fe_2(SO_4)_3}}$$

$$I_{c,Fe_2(SO_4)_3} = 1/2(4*[SO_4^{2-}] + 9*[Fe^{3+}])$$

$$[HSO_4^-] = [H^+]$$

wherein, T represents the leaching temperature, $M_{Fe}$ represents hydrolytic precipitation amount of iron ion at a current time, $[H^+]$ represents the set hydrogen ion concentration in the solution, $S_{Fe}$ represents a saturation of iron ion in the solution, $X_{Ni}$ represents the leaching rate of nickel ion in the solution, $[Fe_2(SO_4)_3(aq)]$ represents a solubility of iron sulfate in the solution, $X_{Ni}^\infty$ represents a maximum leaching rate of nickel ion in the solution, $[SO_4^{2-}]$ represents the first sulfate concentration of in the current time solution, $[Fe^{3+}]$ represents a concentration of iron ion in the solution, is calculated according to the feed ore composition, the pulp concentration, and the pulp flow rate, $[HSO_4^-]$ represents a concentration of hydrogen sulfate ion in the solution, and $I_{c,Fe_2(SO_4)_3}$ represents an ion strength of $[Fe_2(SO_4)_3]$.

S34, according to the hydrolytic precipitation amounts of aluminum ion and iron ion at the set current time and the set current flow rate of sulfuric acid, obtaining a first sulfate concentration in the solution at the current time.

Figure 4:
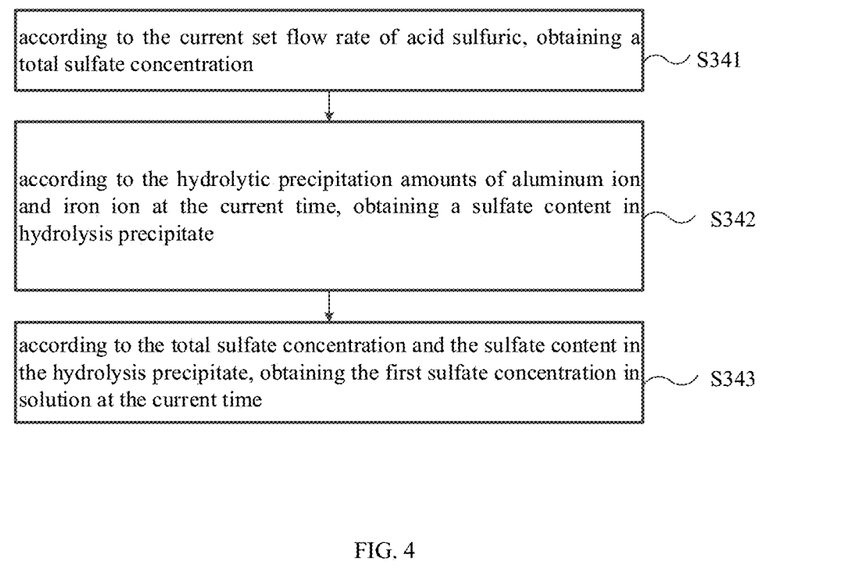
FIG. 4 is a flowchart of step S34 shown in FIG. 3, according to an embodiment of the disclosure.

Referring to FIG. 4, step S34 specifically includes:

S341, according to the current set flow rate of acid sulfuric, obtaining a total sulfate concentration;

S342, according to the hydrolytic precipitation amounts of aluminum ion and iron ion at the current time, obtaining a sulfate content in hydrolysis precipitate;

S343, according to the total sulfate concentration and the sulfate content in the hydrolysis precipitate, obtaining the first sulfate concentration in solution at the current time. Specifically, the first sulfate concentration at the current time solution is a difference between the total sulfate concentration and the sulfate content in the hydrolysis precipitate.

A principle of a calculation process of step S341-S343 is as follows: the total sulfate concentration can be obtained according to an amount of sulfuric acid added into the solution. A part of the sulfuric acid added into the solution forms the sulfate ion, and the other part of the sulfuric acid radicals are hydrolyzed and precipitated by aluminum ion and iron ion as precipitate. Therefore, an actual sulfate concentration in the solution can be obtained by subtracting an amount of sulfuric acid in the precipitate of aluminum ion and iron ion from the total sulfate concentration.

S35, according to the concentrations of nickel ion, cobalt ion, aluminum ion, and iron ion in the solution at the current time, obtaining a second sulfate concentration in the solution at the current time.

A principle of step S35 is as follows: the anion and cation charges are conserved in the solution. The anion in the solution is mainly the sulfate ion. The cation in the solution is mainly the nickel ion, the cobalt ion, the aluminum ion, and the iron ion. A total positive charge concentration of the hydrogen ion, the nickel ion, the cobalt ion, the aluminum ion, and the iron ion is calculated to obtain the sulfate concentration in the solution. It should be noted that, under a high-pressure leaching reaction temperature condition, it is generally considered that $H_2SO_4$ is only ionized to H+ and $HSO_4^-$, and does not directly ionize out of $SO_4^{2-}$. $H^+$ and $HSO_4^-$ are canceled with each other as the positive and negative charges. Therefore, when calculating the cation in a solution, $H^+$ ion is not considered.

S36, comparing the first sulfate concentration with the second sulfate concentration, if the first sulfate concentration and the second sulfate concentration are not equal, correcting the set hydrogen ion concentration in the solution, and repeatedly performing the foregoing steps until the first sulfate concentration and the second sulfate concentration are equal, outputting the set hydrogen ion concentration in the current solution as an actual hydrogen ion concentration.

The set hydrogen ion concentration in the solution is corrected according to a formula as follows:

$$[H^+](\text{after correction}) = [H^+](\text{before correction}) + k \times (SO_4^* - SO_4^{**})$$

wherein, $[H^+]$(after correction) represents a corrected set hydrogen ion concentration, $[H^+]$(before correction) represents a current set hydrogen ion concentration, $SO_4^*$ represents the first sulfate concentration, $SO_4^{**}$ represents the second sulfate concentration, and k represents a proportion coefficient.

A principle of step S36 is as follows: the first sulfate concentration obtained by subtracting the sulfate content in the hydrolysis precipitate of the aluminum ion and the iron ion from the total sulfate concentration is equal to the second sulfate concentration obtained by charge conservation. If the first sulfate concentration is not equal to the second sulfate concentration, it indicates that at the current set time and under the condition of the current flow rate of sulfuric acid, the hydrogen ion concentration in the solution is inaccurate in step S31. Therefore, the hydrogen ion concentration needs to be reset until both are equal, which indicates that the current set hydrogen ion concentration is an accurate value. Therefore, a real-time hydrogen ion concentration may be obtained by using the foregoing method, which provides a basis for subsequently calculating the theoretical leaching rate of nickel.

S4, according to the relationship between the hydrogen ion concentration in the solution and the reaction time, the feed ore composition, the pulp concentration, the pulp flow rate, and the pulp duration time in the autoclave, obtaining a theoretical leaching rate of nickel when a leaching time reaches the pulp duration time in the autoclave at a current flow rate of sulfuric acid, the specific calculation formula is:

$$7.806 \times 10^7 \times e^{-\frac{87.75 \times 10^3}{RT}} [H^+] t = 1 - 3\left(1 - \frac{X_{Ni}}{X_{Ni}^\infty}\right)^{\frac{2}{3}} + 2\left(1 - \frac{X_{Ni}}{X_{Ni}^\infty}\right)$$

Wherein, R represents a gas constant, T represents the leaching temperature, $[H^+]$ represents the hydrogen ion concentration in the solution at a time t, t represents the current time, $X_{Ni}$ represents the leaching rate of nickel ion in the solution at the current time, $X_{Ni}^\infty$ represents a maximum leaching rate of nickel ion in the solution, and is calculated according to the feed ore composition, the pulp concentration, and the pulp flow rate.

S5, comparing the theoretical leaching rate of nickel with the target leaching rate of nickel; if the theoretical leaching rate of nickel is not equal to the target leaching rate of nickel, adjusting the set flow rate of the sulfuric acid, repeatedly performing the foregoing steps until the theoretical leaching rate of nickel is equal to the target leaching rate of nickel, outputting the current flow rate of sulfuric acid as an optimal flow rate of sulfuric acid, and calculating a corresponding optimal acid-to-ore ratio.

Specifically, if the theoretical leaching rate of nickel is greater than the target leaching rate of nickel, reducing the flow rate of sulfuric acid; and if the theoretical leaching rate of nickel is less than the target leaching rate of nickel, increasing the flow rate of sulfuric acid.

S6, according to the optimal acid-to-ore ratio, adjusting an opening degree of a sulfuric acid flow regulating valve of the autoclave to ensure an actual high-pressure acid leaching process is performed under an optimal acid-to-ore ratio condition all the time. This control process can be controlled directly through the program, without manual operation.

In conclusion, a beneficial effect of the technical solution provided in the disclosure includes: providing a high-pressure acid leaching mathematical model and an optimal acid-to-ore ratio calculation method, calculating the optimal acid-to-ore ratio by inputting a real-time feed ore component into the high-pressure acid leaching mathematical model, a sulfuric acid addition flow of a high-pressure leaching link of the clay nickel ore can be dynamically adjusted according to the feed mineral component, so that a high-pressure acid leaching process is always in a dynamic optimal state with the optimal acid-to-ore ratio. Compared with the conventional method for optimizing the acid-to-ore ratio through a pilot experiment, the method has advantages of fast response and accurate optimization.

The following is the program code of the acid leaching process of the autoclave involved in the technical solution:

```
Clear all
Clc
Global t H Xmax1 Xmax2 Xmax3 T
T=input ('Please input temperature K');
Rho=input ('Please input pulp denisty g/cm3');
C=input ('Please enter pulp content%');
V=input ('Please input pulp flow rate m3/h');
CNiin=input ('Please enter Ni content in ore%');
CCoin=input ('Please enter Co content in ore%');
CAlin=input ('Please enter Al content in ore%');
CFein=input ('Please enter Fe content in ore%');
CMgin=input ('Please enter Mg content% in ore');
CMin=input ('Please enter Mn content%in ore');
Ratio=[ ];
Fepre=[ ];
Alpre=[ ];
Hreal=[ ];
Treal=[ ];
Nireal=[ ];
Coreal=[ ];
Treal=[ ];
SO4real=[ ];
Alreal=[ ];
Fereal=[ ];
Mnreal=[ ];
H2SO4real=[ ];
Treal=[ ];
Mgreal=[ ];
M0real=[ ];
Ratiotest=[ ];
Aldissolution=[ ];
Fedissolution=[ ];
Lcreal=[ ];
Alconv=[ ];
Treal=[ ];
Daltat=1;
M1=0.01;
Tmax=50/V*60;
For j=1:0.01:4
H2SO4=rho*c*V*j;
For i=1:1:tmax
T=i*deltat;
R=8.314;
Xmax1=0.95;
Xmax2=0.99;
Xmax3=0.99;
K=0.1;
CAlin=1000*c*rho/100*CAlin*V/100/27/
(V+H2SO4in/1.84);
SO4a=0.18;
SO4b=0.05;
SO4c=0.05;
CinNi=1000*c*rho/100*CNiin/100/58.69*V/
(V + H2SO4in/1.84);
CinCo=1000*c*rho/100*CCoin/100/58.93*V/
(V + H2SO4in/1.84);
CinMg=1000*c*rho/100*CAlin/100/24.3*V/
(V + H2SO4in/1.84);
CinMn=1000*c*rho/100*CMnin/100/54.94*V/
(V + H2SO4in/1.84);
CinFe=1000*c*rho/100*CFein/100/55.845*V/
(V + H2SO4in/1.84);
Err=2;
Al=0.1;
Fe=0.1;
H=0.56;
CMgin=0.2829;
While err>0.0001
   HSO4=H;
If t<=15
   Mg=CMgin*t^0.5/15^0.5;
End
If t>15
   Mg=CMgin;
End
Lc3=0.5* (Mg*4+SO4c*4);
Mgsol=5*H^2/10^ (-1312/T-9.369+34.62*
lc3^0.5/(1+1.6*lc3^0.5) -1.484*lc3);
If Mg>Mgsol
Mg=Mg-0.5* (Mg-Mgsol);
End
Fun1=@untitled6;
XAL=fsolve (fun1, 0.1);
If XAL>0.95
   XAL=0.95;
End
   Aldis=cAlin*XAL;
Lc1=0.5* (9* (0.5*Aldis+0.5*Al) +4*SO4c);
ALsol= ((H*HSO4) ^2.5/10^
(-4464/T+3.774+4.373+14.21*lc1^0.5/
(1+1.6*lc1^0.5)
-1.667*lc1)) ^ (2/3);
   SAL=Al/(2*ALsol);
M0-0.408*H* (SAL-1) *M1*deltat;
   Al=Aldis-M1*3;
If Al>Aldis
   Al=Aldis;
End
XCO=Xmax1* (1- (1- (0.303*exp
(-3179/T) *H*t) ^0.5) ^3);
If XCO>1
   XCO=1;
End
Fun2=@untitled8;
XNI=fsolve (fun2, 0.1);
If XNI>Xmax3
   XNI=Xmax3;
End
   Ni=CinNi*XNI;
```

-continued

```
    Co=CinCo*XCO;
  Lc2=0.5* (Fe*9+ (SO4c) *4);
  Fesol= (H*HSO4)/10
(-2740/T+10.72-9.905*lc2 0.5/
(1+1.6*lc2 0.5) +0.0294*lc2)
0.5;
    SFe=6.21-5.11*XNI/Xmax2;
    Fedis=Fesol*SFe;
    M2=Fedis* (0.01*SFe 2-0.24*SFe+1.23);
      Mn=0.05*SO4b;
    Cr=Mn/1.5;
    Fe=Fedis;
  H2SO4free=SO4b+Cr-0.5*
(3*Fe+3*Al+2*Mg+2*Ni+2*Co);
  Mnsol=9.82*0.0001*exp (4.91(H2SO4free);
    SO4a=H2SO4-M1*3;
    HSO4=H-Cr;
  SO4b=HSO4+1.6* (Ni+Co+Mg+Mn) +1.5*
(Al+Fe);
    SO4c=SO4b-HSO4;
  Err=abs (SO4a-SO4b);
  H=H+k* (SO4a-SO4b);
  R=M2*2*55.84/(M1*27*3+M2*2*55.845);
    Mn=0.05*SO4b;
    NiM=Ni*58.69;
    CoM=Co*58.93;
    AlM=Al*27;
    MgM=Mg*24.3;
    FeM=Fe*55.845;
    MnM=Mn*54.94;
  Nire=real (NiM);
  Core=real (CoM);
  Alre=real (AlM);
  Mgre=real (MgM);
  Fere=real (FeM);
  Mnre=real (MnM);
  End
    M1=M1+M0;
  DeltaT=541.72*M1*55/(3*4.2*50);
  Ratio (i) =r;
  Treal (i) =t;
  Fepre (i) =M2*55.845;
  Alpre (i) =M1*27;
  Hreal (i) =H;
  Nireal (i) =Ni;
  Coreal (i) =Co;
  SO4real (i) =SO4a;
  Alreal (i) =Al;
  Fereal (i) =Fe*10;
    Fe=Fe*10;
  Mnreal (i) =Mn;
  H2SO4real (i) =H2SO4free;
  Treal (i) =T;
  Mgreal (i) =Mg;
  M0real (i) =M1;
  Aldissolution (i) =ALsol;
  Fedissolution (i) =Fedis;
  Lcreal (i) =lc1;
  Alconv (i) =XAL;
  SAl (i) =SAL;
  Treal (i) =T;
  If Ni>=Nidef
  Disp ('optimal acid-to-ore ratio');
  Dsip (j);
  Disp ('Ni content of leach solution after high-
pressure acid leaching g/L');
  Disp (Nire);
  Disp ('Co content of leach solution after high-
pressure acid leaching at');
  Disp (Core);
  Disp ('Fe content of leach solution after high-
pressure acid leaching g/L');
  Disp (Fere);
  Disp ('Al content of leach solution after high-
pressure acid leaching g/L');
  Disp (Alre);
  Disp ('Mg content of leach solution after high-
pressure acid leaching g/L');
  Disp (Mgre);
  Disp ('Mn c content of leach solution after
high=pressure acid leaching g/L');
  Disp Mnre);
  End
```

Technical Solution Verification Experiment

To verify a reliability of the above-mentioned calculation model, a laboratory small test apparatus is used to perform an acid-to-ore ratio optimization verification experiment, and reaction process parameters of the small test apparatus is input into the above-mentioned calculation program to obtain the optimal acid-to-ore ratio as 0.27.

Then, the small test apparatus is used to perform parallel experiments under multiple acid-to-ore ratios. An experimental result is shown in FIG. 5.

Figure 5:
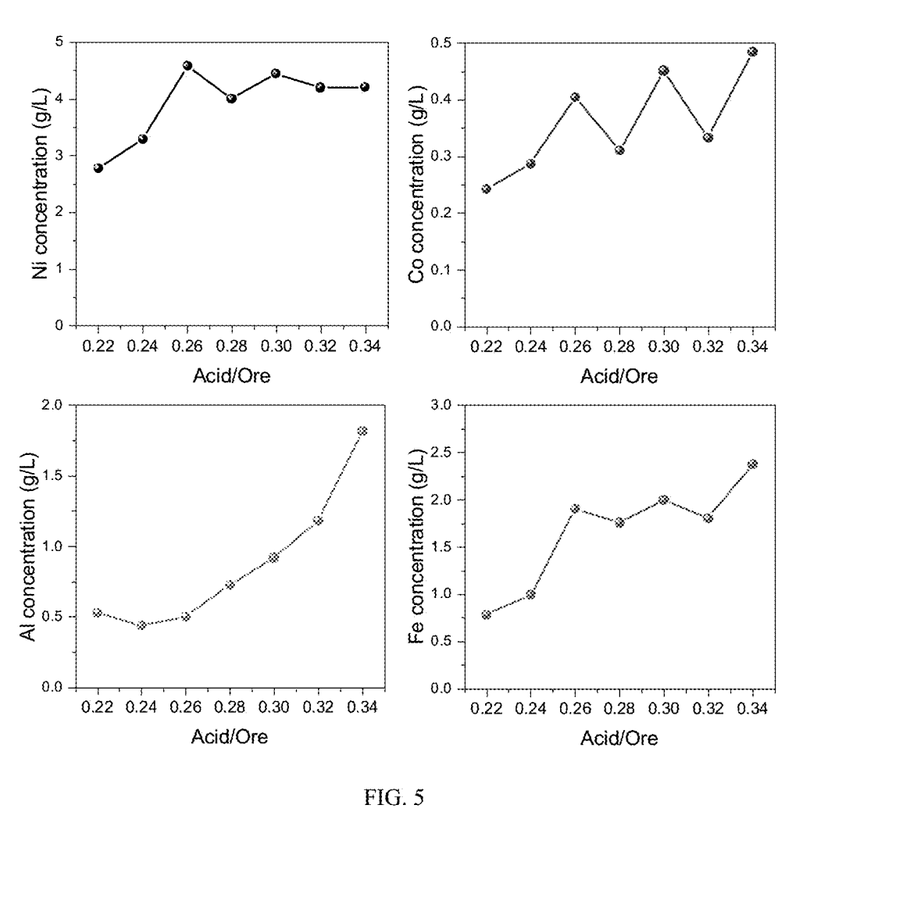
FIG. 5 is schematic diagrams of experimental results of parallel experiments under multiple acid-to-ore ratios by using a small test apparatus.

As shown in FIG. 5, when the acid-to-ore ratio is 0.26, Ni has a highest leaching rate at the acid-to-ore ratio, leaching rates of Al and Fe are relatively low, thereby reducing subsequent separation costs.

TABLE 1

Operation conditions, leaching effects, and leaching cost of the acid high-pressure leaching process before and after optimization

| | acid-to-ore ratio | Ni leaching rate (%) | Co leaching rate (%) | Al leaching rate (%) | Operation cost ($/h) |
|---|---|---|---|---|---|
| Before optimization | 0.33 | 98% | 100% | 38% | 2822 |
| After optimization | 0.27 | 98% | 100% | 16% | 2736 |

Table 1 shows operating conditions, leaching effects, and leaching costs of a high-pressure acid leaching process before and after optimization. As shown in Table 1, an optimal acid-to-ore ratio obtained by performing dynamic optimization by using the calculation model is basically consistent with an experimental result obtained by performing acid-to-ore ratio optimization by a laboratory small-scale test apparatus, which ensures the leaching rate of a target metal such as Ni, Co, and Mn while limiting the leaching rate of a non-target element such as Al. A production cost of 86 $/h can be saved by optimizing the acid-to-ore ratio, and an annual cost of the apparatus is about 751,300$, and a waste of sulfuric acid is not required, thereby promoting efficient and energy saving of the high-pressure acid leaching process of laterite nickel ore.

The foregoing description are merely preferred specific implementation of the disclosure, but are not intended to limit the protection scope of the disclosure. Any variation or replacement readily figured out by a person skilled in the art within the technical scope disclosed in the disclosure shall fall within the protection scope of the disclosure.

What is claimed is:

1. A dynamic optimization method for acid-to-ore ratio in high pressure leaching of laterite nickel ore, comprising:
    obtaining a feed ore composition, a pulp concentration, a pulp flow rate, a leaching temperature and a pulp duration time in an autoclave, and setting a target leaching rate of nickel;
    setting a flow rate of sulfuric acid;
    according to the set flow rate of sulfuric acid, the feed ore composition, the pulp concentration, the pulp flow rate, and the leaching temperature, obtaining a relationship between a hydrogen ion concentration in a solution and a reaction time;

according to the relationship between the hydrogen ion concentration in the solution and the reaction time, the feed ore composition, the pulp concentration, the pulp flow rate, and the pulp duration time in the autoclave, obtaining a theoretical leaching rate of nickel when a leaching time reaches the pulp duration time in the autoclave at a current flow rate of sulfuric acid;

comparing the theoretical leaching rate of nickel with the target leaching rate of nickel; if the theoretical leaching rate of nickel is not equal to the target leaching rate of nickel, adjusting the set flow rate of the sulfuric acid, repeatedly performing the foregoing steps until the theoretical leaching rate of nickel is equal to the target leaching rate of nickel, outputting the current flow rate of sulfuric acid as an optimal flow rate of sulfuric acid, and calculating a corresponding optimal acid-to-ore ratio; and according to the optimal acid-to-ore ratio, adjusting an opening degree of a sulfuric acid flow regulating valve of the autoclave to ensure that an actual acid leaching process is performed under an optimal acid-to-ore ratio condition during an entire duration of the acid leaching process.

2. The dynamic optimization method for acid-to-ore ratio in leaching of laterite nickel ore according to claim 1, wherein according to the set flow rate of the sulfuric acid, the feed mineral composition, the pulp concentration, the pulp flow rate, and the leaching temperature, obtaining a relationship between a hydrogen ion concentration in a solution and a reaction time, comprises:

setting a current time and a hydrogen ion concentration in the solution under a condition of the current flow rate of sulfuric acid;

according to the feed ore composition, the pulp concentration, the pulp flow rate, the set flow rate of sulfuric acid, and the set hydrogen ion concentration in the solution, obtaining leaching rates of nickel ion, cobalt ion, aluminum ion, and iron ion in the solution at the current time;

according to the leaching rates of aluminum ion and iron ion in the solution, obtaining hydrolytic precipitation amounts of aluminum ion and iron ion at the current time;

according to the hydrolytic precipitation amounts of aluminum ion and iron ion at the set current time and the set current flow rate of sulfuric acid, obtaining a first sulfate concentration in the solution at the current time;

according to concentrations of nickel ion, cobalt ion, aluminum ion, and iron ion in the solution at the current time, obtaining a second sulfate concentration in the solution at the current time; and comparing the first sulfate concentration with the second sulfate concentration, if the first sulfate concentration and the second sulfate concentration are not equal, correcting the set hydrogen ion concentration in the solution, and repeatedly performing the foregoing steps until the first sulfate concentration and the second sulfate concentration are equal, outputting the set hydrogen ion concentration in the current solution as an actual hydrogen ion concentration.

3. The dynamic optimization method for acid-to-ore ratio in leaching of laterite nickel ore according to claim 2, wherein according to the feed ore composition, the pulp concentration, the pulp flow rate, the set flow rate of sulfuric acid, and the set hydrogen ion concentration in the solution, obtaining leaching rates of nickel ion, cobalt ion, aluminum ion, and iron ion in the solution at the current time, the leaching rate of nickel ion in the solution at the current time is obtained according to a formula as follows:

$$7.806 \times 10^7 \times e^{-\frac{87.75 \times 10^3}{RT}}[H^+]t = 1 - 3\left(1 - \frac{X_{Ni}}{X_{Ni}^\infty}\right)^{\frac{2}{3}} + 2\left(1 - \frac{X_{Ni}}{X_{Ni}^\infty}\right),$$

wherein, R represents a gas constant, T represents the leaching temperature, $[H^+]$ represents the set hydrogen ion concentration in the solution, t represents the current time, $X_{Ni}$ represents the leaching rate of nickel ion in the solution at the current time, $X_{Ni}^\infty$ represents a maximum leaching rate of nickel ion in the solution, and is calculated according to the feed ore composition, the pulp concentration, and the pulp flow rate.

4. The dynamic optimization method for acid-to-ore ratio in leaching of laterite nickel ore according to claim 2, wherein the leaching rate of cobalt ion in the solution at the current time is obtained according to a formula as follows:

$$0.303 \times e^{-\frac{3179}{RT}}[H^+]t = \left(1 - \left(1 - \frac{X_{Co}}{X_{Co}^\infty}\right)^{\frac{1}{3}}\right)^2,$$

wherein, R represents a gas constant, T represents the leaching temperature, $[H^+]$ represents the set hydrogen ion concentration in the solution, t represents the current time, $X_{Co}$ represents the leaching rate of cobalt ion in the solution at the current time, $X_{Co}^\infty$ represents a maximum leaching rate of cobalt ion in the solution, and is calculated according to the feed ore composition, the pulp concentration, and the pulp flow rate.

5. The dynamic optimization method for acid-to-ore ratio in leaching of laterite nickel ore according to claim 2, wherein the leaching rate of aluminum ion in the solution at the current time is obtained according to a formula as follows:

$$2.68 \times 10^9 \times e^{-\frac{101.9 \times 10^3}{RT}}[H^+]t = 1 - 3\left(1 - \frac{X_{Al}}{X_{Al}^\infty}\right)^{\frac{2}{3}} + 2\left(1 - \frac{X_{Al}}{X_{Al}^\infty}\right),$$

wherein R represents a gas constant, T represents the leaching temperature, $[H^+]$ represents the set hydrogen ion concentration in the solution, t represents the current time, $X_{Al}$ represents the leaching rate of aluminum ion at the current time in the solution, $X_{Al}^\infty$ represents a maximum leaching rate of aluminum ion in the solution, and is calculated according to the feed ore composition, the pulp concentration, and the pulp flow rate.

6. The dynamic optimization method for acid-to-ore ratio in leaching of laterite nickel ore according to claim 2, wherein the leaching rate of iron ion in the solution at the current time is obtained according to a formula as follows:

$$4.91 \times 10^8 \times e^{-\frac{93.03 \times 10^3}{RT}}[H^+]t = 1 - 3\left(1 - \frac{X_{Fe}}{X_{Fe}^\infty}\right)^{\frac{2}{3}} + 2\left(1 - \frac{X_{Fe}}{X_{Fe}^\infty}\right),$$

wherein, R represents a gas constant, T represents the leaching temperature, [H$^+$] represents the set hydrogen ion concentration in the solution, t represents the current time, $X_{Fe}$ represents the leaching rate of iron ion in the solution at the current time, $X_{Fe}^{\infty}$ represents a maximum leaching rate of iron ion in the solution, and is calculated according to the feed ore composition, the pulp concentration, and the pulp flow rate.

7. The dynamic optimization method for acid-to-ore ratio in leaching of laterite nickel ore according to claim 2, wherein according to the leaching rates of aluminum ion and iron ion in the solution, obtaining hydrolytic precipitation amounts of aluminum ion and iron ion at the current time, the hydrolytic precipitation amount of aluminum ion at the current time is obtained according to formulas as follows:

$$\frac{dM_{Al}}{dt} = 0.408[H^+](S_{Al} - 1)M_{Al}$$

$$S_{Al} = \frac{C_{Al}^{in} \times X_{Al}}{[Al_2(SO_4)_3(aq)]}$$

$$lg\left(\frac{[H^+]^{5/2}[HSO_4^-]^{5/2}}{[Al_2(SO_4)_3(aq)]}\right) = -\frac{4464}{T} + 3.774 + \frac{14.21\sqrt{I_{c,Al_2(SO_4)_3}}}{1 + 1.6\sqrt{I_{c,Al_2(SO_4)_3}}} -$$

$$1.667\sqrt{I_{c,Al_2(SO_4)_3}}$$

$$I_{c,Al_2(SO_4)_3} = 1/2(4*[SO_4^{2-}] + 9*[Al^{3+}])$$

$$[HSO_4^-] = [H^+],$$

wherein, T represents the leaching temperature, t represents the current time, $M_{Al}$ represents the current hydrolytic precipitation amount of aluminum ion in the solution at the current time, [H$^+$] represents the set hydrogen ion concentration in the solution, $S_{Al}$ represents a saturation of aluminum ion in the solution, $X_{Al}$ represents the leaching rate of aluminum ion in the solution, $C_{Al}^{in}$ represents an Al concentration in the pulp, and is calculated according to the feed ore composition, the pulp concentration, and the pulp flow rate, [Al$_2$(SO$_4$)$_a$(aq)] represents a solubility of aluminum sulfate in the solution, [SO$_4^{2-}$] represents the first sulfate concentration in the solution at the current time, [Al$^{3+}$] represents the concentration of aluminum ion in the solution, and is calculated according to the feed ore composition, the pulp concentration, and the pulp flow rate, [HSO$_4^-$] represents a concentration of hydrogen sulfate ion in the solution, and $I_c$Al$_2$(SO$_4$)$_2$ represents an ion strength of Al$_2$(SO$_4$)$_3$.

8. The dynamic optimization method for acid-to-ore ratio in leaching of laterite nickel ore according to claim 2, wherein the hydrolytic precipitation amount of iron ion at the current time is obtained according to formulas as follows:

$$\frac{M_{Fe}}{[Fe_2(SO_4)_3(aq)] \times S_{Fe}} = 0.0114S_{Fe}^2 - 0.254S_{Fe} + 1.2483$$

$$S_{Fe} = 6.725 - 5.735\frac{X_{Ni}}{X_{Ni}^{\infty}}$$

$$lg\left(\frac{[H^+][HSO_4^-]}{[Fe_2(SO_4)_3(aq)]}\right) = -\frac{2740}{T} + 10.72 - \frac{9.905\sqrt{I_{c,Fe_2(SO_4)_3}}}{1 + 1.6\sqrt{I_{c,Fe_2(SO_4)_3}}} +$$

$$0.0294\sqrt{I_{c,Fe_2(SO_4)_3}}$$

$$I_{c,Fe_2(SO_4)_3} = 1/2(4*[SO_4^{2-}] + 9*[Fe^{3+}])$$

$$[HSO_4^-] = [H^+],$$

wherein, T represents the leaching temperature, $M_{Fe}$ represents hydrolytic precipitation amount of iron ion at the current time, [H$^+$] represents the set hydrogen ion concentration in the solution, $S_{Fe}$ represents a saturation of iron ion in the solution, $X_{Ni}$ represents the leaching rate of nickel ion in the solution, [Fe$_2$(SO$_4$)$_2$(aq)] represents a solubility of iron sulfate in the solution, $X_{Ni}^{\infty}$ represents a maximum leaching rate of nickel ion in the solution, [SO$_4^{2-}$] represents the first sulfate concentration of in the current time solution, [Fe$^{3+}$] represents the concentration of iron ion in the solution, and is calculated according to the feed ore composition, the pulp concentration, and the pulp flow rate, [HSO$_4^-$], represents a concentration of hydrogen sulfate ion in the solution, and $I_c$Fe$_2$(SO$_4$)$_2$ represents an ion strength of [Fe$_2$(SO$_4$)$_3$].

9. The dynamic optimization method for acid-to-ore ratio in leaching of laterite nickel ore according to claim 2, wherein according to the hydrolytic precipitation amounts of aluminum ion and iron ion at the set current time and the set current flow rate of sulfuric acid, obtaining a first sulfate concentration in the solution at the current time, comprises:
according to the current set flow rate of sulfuric acid, obtaining a total sulfate concentration;
according to the hydrolytic precipitation amounts of aluminum ion and iron ion at the current time, obtaining a sulfate content in hydrolysis precipitate;
according to the total sulfate concentration and the sulfate content in the hydrolysis precipitate, obtaining the first sulfate concentration in solution at the current time.

10. The dynamic optimization method for acid-to-ore ratio in leaching of laterite nickel ore according to claim 2, wherein comparing the first sulfate concentration with the second sulfate concentration, if the first sulfate concentration and the second sulfate concentration are not equal, correcting the set hydrogen ion concentration in the solution, and repeatedly performing the foregoing steps until the first sulfate concentration and the second sulfate concentration are equal, outputting the set hydrogen ion concentration in the current solution as an actual hydrogen ion concentration, the set hydrogen ion concentration in the solution is corrected according to a formula as follows:

$$[H^+](\text{after correction}) = (\text{before correction}) + k)[H^+] \times (SO_4^* - SO_4^{**}),$$

wherein, [H$^+$](after correction) represents a corrected set hydrogen ion concentration, [H$^+$](before correction) represents the current set hydrogen ion concentration, SO$_4$* represents the first sulfate concentration, SO$_4$** represents the second sulfate concentration, and k represents a proportion coefficient.

11. The dynamic optimization method for acid-to-ore ratio in leaching of laterite nickel ore according to claim 1, wherein according to the feed ore composition, the pulp concentration, the pulp flow rate, the set flow rate of sulfuric acid, and the set hydrogen ion concentration in the solution, obtaining leaching rates of nickel ion, cobalt ion, aluminum ion, and iron ion in the solution at the current time, the theoretical leaching rate of nickel when a leaching time reaches the pulp duration time in the autoclave at a current flow rate of sulfuric acid is obtained according to a formula as follows:

$$7.806 \times 10^7 \times e^{-\frac{87.75 \times 10^3}{RT}} [H^+]t = 1 - 3\left(1 - \frac{X_{Ni}}{X_{Ni}^\infty}\right)^{\frac{2}{3}} + 2\left(1 - \frac{X_{Ni}}{X_{Ni}^\infty}\right),$$

wherein, R represents a gas constant, T represents the leaching temperature, $[H^+]$ represents the hydrogen ion concentration in the solution at a time t, t represents the current time, $X_{Ni}$ represents the leaching rate of nickel ion in the solution at the current time, $X_{Ni}^\infty$ represents a maximum leaching rate of nickel ion in the solution, and is calculated according to the feed ore composition, the pulp concentration, and the pulp flow rate.

12. The dynamic optimization method for acid-to-ore ratio in leaching of laterite nickel ore according to claim 1, wherein comparing the theoretical leaching rate of nickel with the target leaching rate of nickel; if the theoretical leaching rate of nickel is not equal to the target leaching rate of nickel, adjusting the set flow rate of the sulfuric acid, repeatedly performing the foregoing steps until the theoretical leaching rate of nickel is equal to the target leaching rate of nickel, comprises:

if the theoretical leaching rate of nickel is greater than the target leaching rate of nickel, reducing the flow rate of sulfuric acid; and
  if the theoretical leaching rate of nickel is less than the target leaching rate of nickel, increasing the flow rate of sulfuric acid.

* * * * *